United States Patent [19]

Kammerlander

[11] 4,394,760

[45] Jul. 19, 1983

[54] PROCESS FOR MONITORING ANALOG AND DIGITAL MOBILE RADIO CONNECTIONS

[75] Inventor: Karl Kammerlander, Wolfratshausen, Fed. Rep. of Germany

[73] Assignee: Siemens Aktiengesellschaft, Berlin & Munich, Fed. Rep. of Germany

[21] Appl. No.: 238,071

[22] Filed: Mar. 2, 1981

[30] Foreign Application Priority Data

Mar. 31, 1980 [DE] Fed. Rep. of Germany ....... 3012513

[51] Int. Cl.³ .............................................. H04J 3/00
[52] U.S. Cl. ....................................... 370/111; 375/38
[58] Field of Search .................... 370/111, 58, 83, 84, 370/109; 375/38

[56] References Cited

U.S. PATENT DOCUMENTS 3,310,741 3/1967 Uitermark et al. .................... 375/38
3,636,524 1/1972 Holland ............................... 370/111
4,151,373 4/1979 Widmer et al. ....................... 370/111

FOREIGN PATENT DOCUMENTS 1562964 3/1980 United Kingdom .

Primary Examiner—Thomas H. Robinson
Attorney, Agent, or Firm—Hill, Van Santen, Steadman, Chiara & Simpson

[57] ABSTRACT

A process for monitoring analog and digital mobile radio connections is disclosed within the framework of a mobile radio network comprising a number of radio base stations in a mutual spatial arrangement in the form of a cellular system having overlapping radio ranges. A predetermined number of radio ranges, directly adjacent to one another, form a group of radio ranges in which the total number of available frequency channels is repeated. A simple functionally-reliable monitoring system provides that the useful signals transmitted in the specific time slots are radio range related information blocks which are time compressed and delayed at the transmitting end. Data block sequences containing monitoring signals are inserted into the time gaps which arise during time compression. At the receiving end, following the gating out of the data block sequences to a signal processing unit, the compressed received useful signal is fed to an expansion device. The time blocks are thus brought to precisely the same length as the original useful signal.

4 Claims, 2 Drawing Figures

PROCESS FOR MONITORING ANALOG AND DIGITAL MOBILE RADIO CONNECTIONS

BACKGROUND OF THE INVENTION

1. Field of the Invention

The present invention relates to a process for monitoring analog and digital mobile radio connections, and more particularly to the monitoring of such connections of a mobile radio network comprising a number of radio base stations in a mutually spaced arrangement in the form of a cellular system having overlapping radio ranges in which a predetermined number of radio ranges which are directly adjacent to one another form a group of radio ranges in which the total number of available frequency channels is repeated. More particularly, the frequency distribution plan for the radio base stations is designed to be such that like channel disturbances in a radio range, including an extended boundary zone, are substantially eliminated and at least the signaling in digital form between the radio base stations and the mobile subscriber stations is carried out by way of organization channels designed for duplex operation.

2. Description of the Prior Art

For a mobile radio network of this kind, such as is known for example through the German allowed published application No. 2,659,635, corresponding to British Pat. No. 1,562,964, an earlier application has proposed a realization for the transmission of the items of information containing the organization functions between the radio base stations and the mobile subscriber stations. Considerable significance is assigned to the monitoring of the radio connections, in particular with regard to the subscriber individual identification of the radio connections for the purpose of a realistic, error-free charge metering and the measurement and monitoring of the signal-to-noise ratio of the connection which permits the connection to be automatically broken or switched over as soon as a minimum permissible signal-to-noise ratio is undershot for a specific length of time.

Previously, the charge metering was derived exclusively from the received field strength. In this case, the charge metering can be falsely maintained by interference signals or overshooting.

In this case, identification and monitoring of the speech quality is impossible. Additional signaling must be transmitted in separate narrow-band channels, which result in a high filter expense.

SUMMARY OF THE INVENTION

The object of the present invention is to provide, in mobile radio connections, a simple, functionally-reliable monitoring system by which the above-described disadvantages of known devices are avoided.

This object is realized, according to the present invention, in that the useful signals transmitted in specific time slots as radio range related information blocks (time blocks) are at the transmitting end provided with a time compression and sequences of data blocks containing monitoring signals (subsidiary blocks of a signaling block) are inserted into the time gaps arising due to the time compression. At the receiving end, following extraction of the data block sequences which are supplied to a signaling processing unit from the assembled sum signal the compressed received useful signal is fed to an expansion device and the time blocks are brought to exactly the same length as the original useful signal.

In an advantageous development of the invention, it is provided that the compression is effected in such a manner that the useful signal which is to be transmitted is input into an analog intermediate memory (buffer store) and is read out again more rapidly with a slight time delay, and that the expansion is effected in such a manner that the compressed received useful signal is input into a buffer store at a clock rate increased in accordance with the read out of the transmitting end memory and is read again with the input clock rate originally used at the transmitting end.

The synchronization of the data blocks is advantageously effected by synchronization to the organization channel of the radio network.

The sequences of data blocks advantageously contain items of information concerning a subscriber individual identification of the mobile radio connections and the signal-to-noise ratio of the connection, and also signals relating to the subscriber and system internal signals.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
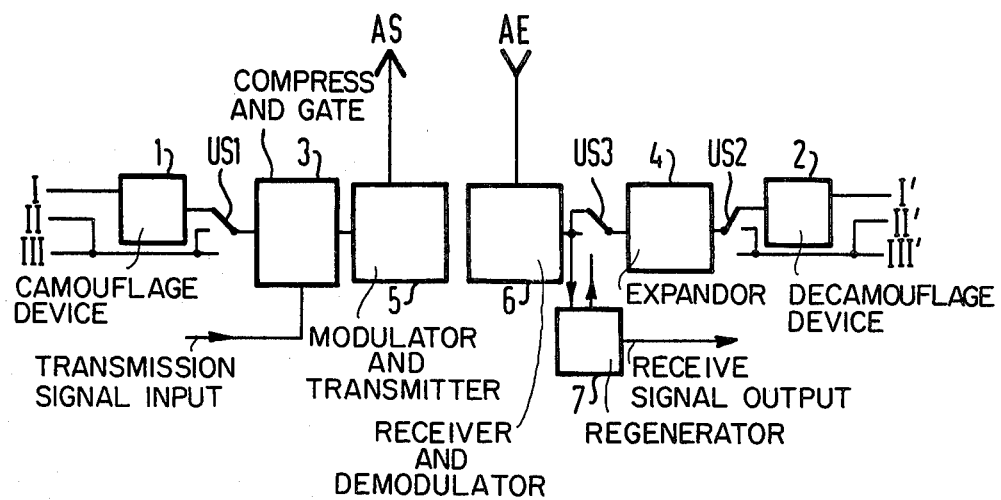
FIG. 1 is a block circuit diagram of a speech channel constructed in accordance with the invention.

FIG. 1 illustrates a channel which is provided for various modes of operation. This can relate to the transmission of camouflaged speech (input I), clear speech or a.c. telegraphy (input II) or digital data (input III). To allow switchover to the various modes of operation, switches US1 and US2 are arranged at the transmitting end and the receiving end, respectively. At the transmitting end, the transmission path of the camouflaged speech contains a camouflage device 1 and at the receiving end a decamouflage device 2.

At the transmitting end there is arranged a device 3 which serves to compress the input useful signal and to gate in a transmitting signal, the device 3 being connected at its output to the transmitter and modulator 5. The latter is connected to a transmitting antenna AS. The receiving antenna AE is connected to a receiver and demodulator 6, which is followed by a switch US3 and whose output is further connected to a device which serves to gate out the received signal and to a regenerator 7. Following the switch US3, the signal path contains a device 4 which serves to expand the received useful signal and which is connected to the switch US2 by way of which the relevant output I', II', III' is connected in accordance with particular mode of operation being used. For camouflaged speech, the decamouflaging device 2 is connected to the output I'.

According to the invention, connection monitoring is carried out with the use of level monitoring and pilot monitoring, in such a manner that at the transmitting end short data block sequences are inserted into the analog and camouflaged speech signals and are extracted at the receiving end. At the transmitting end, the speech signals are quantized in time blocks and are transmitted with a slight time compression. The time compression gives rise to short gaps in the speech signal into which corresponding data block sequences are inserted. At the receiving end, these data block sequences are read out as data messages. They are extracted from the speech signals and the gaps are accurately closed by time expansion. In this manner, it is possible to exchange data signals simultaneously with the exchange of speech signals. This data exchange serves, on the one hand, for connection monitoring purposes. In order to monitor the connection, both the radio range number and the radio subscriber number of the subscriber in question are continuously mutually exchanged by way of mutual identification signals. For such time as these identification signals are received satisfactorily the connection is in order. In the event of common channel disturbances which influence the connection in respect of field strength or, following the end of a conversation, simulate the connection, due to the absence of identification the connection is broken and the charge metering is stopped. This avoids unnecessary channel seizure and the channel can immediately be made available for new connections.

In addition to the subscriber individual identification of mobile radio connections for the purpose of realistic error-free charge metering and the interruption of the connection in the event of the loss of the legibility of the identification without taking into account the prevailing received signal strength and measuring and monitoring of the signal-to-noise ratio of the connection which allows the connection to be automatically cleared or switched over as soon as a minimum permissible signal-to-noise ratio is undershot for a specific length of time, the inserted data block sequences can also serve to transmit signals which relate to the subscriber, such as charge level, priority signals and subscriber numbers of subscribers who during a connection have in vain attempted to call and also the transmission of system internal signals which relate to the radio organization flow, such as e.g. the setting up of the transmitting power, clearing signals or switch-over signals.

The signal compression is effected in that at the transmitting end in the device 3 the useful signal is input into an analog buffer store whose length and clock frequency are dimensioned to be such that it is fitted within the given time of a signal subsidiary block. The reading from the store is carried out in parallel at a higher clock rate, the beginning being delayed by the signaling subsidiary block length. The subsidiary blocks of a digital signal (data signal = signaling block composed of a number of small subsidiary blocks) are inserted into the gaps thus formed. This process is repeated periodically.

At the receiving end, the subsidiary blocks are extracted and the gaps are closed again by an analog intermediate memory. Here, the compressed received useful signal is input into the intermediate memory at a clock rate which is higher, according to the reading clock rate at the transmitting end memory, and is read again with the input clock rate originally used at the transmitting end. Therefore, a clear channel is available for the useful information in every situation (speech, a.c. telegraphy data or digital data).

Figure 2:
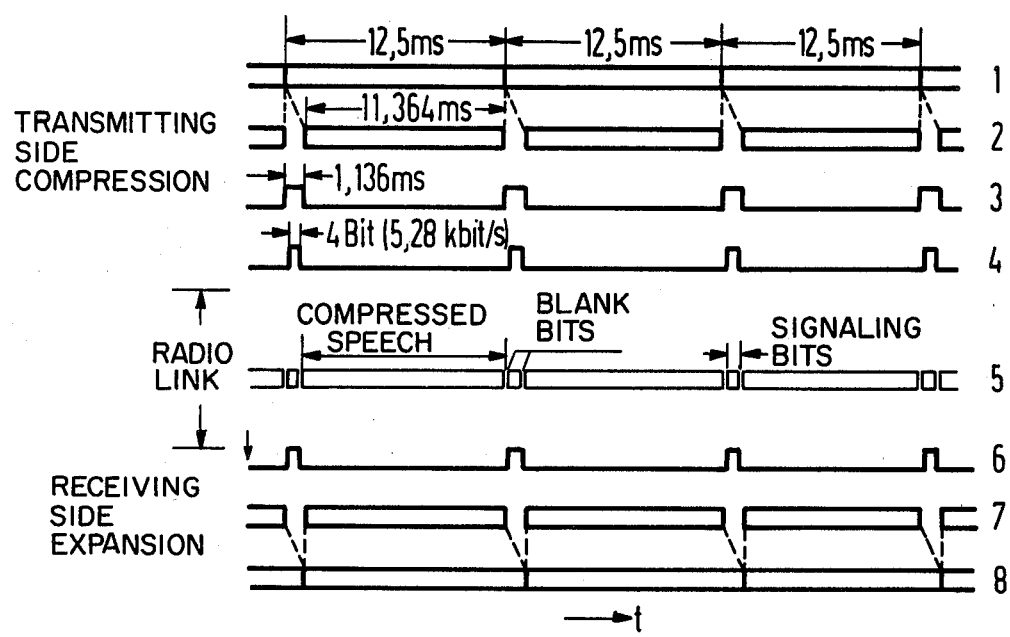
FIG. 2 is a timing chart illustrating the signal compression and signal expansion employed in practicing the present invention.

The compression and expansion process and the insertion and extraction of the data block sequences will be explained in the following in a time flow plan corresponding to FIG. 2. In FIG. 2 the line 1 represents the useful signal which is quantized in 12.5 ms time blocks. A subsidiary frame is formed of 48 of these time blocks (48·12.5 ms = 600 ms) in the organization plan. Line 2 illustrates the compressed useful signal where the time blocks each have a length of 11.364 ms. The signal gaps of 1.136 ms which in each case occur at the beginning of a time block as a result of time delay are represented in line 3. The signal gaps of 1.136 ms each contain space for 6 bits at a data rate of 5.28 kBit/s. However, a block of only 4 bits is gated into each gap (line 4) and a blank bit is left preceding and following this four-bit block. The gating in of these blank bits avoids mutual influence between the data signal and the useful signal. The assembled sum signal which is transmitted over the radio path is illustrated in line 5. Line 6 illustrates the extracted data block sequence at the receiving end, which is analyzed within a signal processing procedure. In the expansion device 4, the compressed received useful signal (line 7) is again input into a buffer memory at a clock rate increased by 9.1% over the original clock rate and is read with the input clock rate originally used at the transmitting end. In this manner, all the gaps are precisely closed, as is illustrated by the expanded useful signal shown in line 8.

The precise time synchronism required for this process is provided by the synchronization to the organization channel and is not lost during the connection in the speech channels because of the gating in of data. The signaling phases are precisely in synchronism with the synchronization conditioned sub-frame (600 ms).

As a result of the uniform distribution of the sub-blocks during the signal transmission, from a telephone technology viewpoint a minimum additional transit time of approximately 1 ms per speech direction is achieved. The radio technology advantage of this finely-graded distribution lies in the precise detection of the noise mean value of the radio link which is produced by Rayleigh fading (speed dependent Rayleigh noise during motion operation). The detection of the noise which is independent of speed is assured by the distribution of the sub-blocks in combination with a corresponding integration time. The signal-to-noise ratio of the useful connection is evaluated by measuring the phase jitter of the sub-blocks.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a process for monitoring analog and digital mobile radio connections in a mobile radio network comprising a plurality of mobile radio subscriber stations and a plurality of base stations which are mutually spaced in a cellular arrangement having rigidly prescribed overlapping radio ranges which are directly adjacent one another as radio range groups in which the total number of available frequency channels is repeated, in which the frequency distribution plan for the base stations is designed such that common channel disturbances in a radio range, including an extended boundary zone of the overlapping, are substantially eliminated, in which at least the signaling in digital form between the base stations and the mobile subscriber stations is carried out over duplex time-division multiplex organization channels, in which radio range related information blocks are time compressed for transmission, and in which the time-compressed information blocks are expanded to obtain useful information, the improvement therein comprising the steps of:

time compressing analog radio range related information blocks which are to be transmitted as useful signals in specific time slots to produce gaps between the information blocks including delaying the compressed information blocks;

inserting data block sequences into the gaps, containing monitoring signals including subscriber identification, the signal-to-noise ratio of the connection and subscriber and network internal signals;

transmitting the composite signals so formed to a receiver and receiving the same;

extracting the data block sequences from the received composite signals; and then expanding the time-compressed information blocks to their original lengths to obtain the useful information.

2. The improved process of claim 1, wherein the steps of time compressing and delaying are defined as:

storing the information blocks serially into a buffer at a first clock rate; and reading the stored information blocks with a time delay at a higher, second clock rate.

3. The improved process of claim 1, wherein the step of expanding is defined as:

storing the time-compressed information blocks at a second clock rate; and reading the stored information blocks at a lower, first clock rate.

4. The improved process of claim 1, comprising the step of:

synchronizing the data blocks by synchronizing the transmitter and receiver over an organization channel.

* * * * *